United States Patent [19]

Engelmann

[11] 4,080,419
[45] Mar. 21, 1978

[54] FOAM INJECTION LEACHING PROCESS FOR FRAGMENTED ORE

[75] Inventor: William H. Engelmann, Minneapolis, Minn.

[73] Assignee: The United States of America as represented by the Secretary of the Interior, Washington, D.C.

[21] Appl. No.: 749,586

[22] Filed: Dec. 10, 1976

[51] Int. Cl.$^2$ ............................................. C22B 15/10
[52] U.S. Cl. ................................... 423/32; 75/101 R; 75/103; 75/117; 299/5; 423/41
[58] Field of Search .................... 75/101 R, 117, 103; 299/5; 423/32, 41

[56] References Cited

U.S. PATENT DOCUMENTS

| | | | |
|---|---|---|---|
| 2,161,800 | 6/1939 | Cross | 299/5 |
| 2,822,158 | 2/1958 | Brinton | 299/5 X |
| 3,498,674 | 3/1970 | Matthews | 299/5 X |
| 3,647,423 | 3/1972 | Acoveno | 75/117 X |
| 3,708,206 | 1/1973 | Hard et al. | 299/5 |
| 3,799,764 | 3/1974 | Opie et al. | 75/117 X |
| 3,841,705 | 10/1974 | Girard et al. | 299/4 |
| 3,894,770 | 7/1975 | Huff et al. | 299/5 |
| 4,017,120 | 4/1977 | Carlson et al. | 299/5 |

FOREIGN PATENT DOCUMENTS 219,785 of 1928 Australia ............................ 75/101 R Primary Examiner—G. Ozaki
Attorney, Agent, or Firm—William S. Brown; Donald A. Gardiner

[57] ABSTRACT

This invention relates to a process for leaching broken or fragmented ore or metal-value containing bodies with a reagent-carrying foam. The foam is generated by adding a surfactant to a leaching solution and passing air or other gas through the solution to generate relatively stable foam bubbles which are propelled through the fragmented mass by gas pressure. The foam can be injected in cycles, allowing drain time, or can be injected continuously with the leachant drainage taking place at the periphery of the ore mass and removed continuously.

7 Claims, No Drawings

FOAM INJECTION LEACHING PROCESS FOR FRAGMENTED ORE

FIELD OF THE INVENTION

This invention relates to a method for leaching a fragmented ore body or broken ore, mill tailings, or dumps or other fragmented metal-value containing bodies with a reagent-carrying foam. More particularly the invention is directed to the formation of a relatively stable reagent-carrying foam propelling the foam through the fragmented material, permitting the foamed leachant to drain, and recovering the drained leachant containing metal values. The term fragmented ore or ore-body as employed herein is to be understood to include mill tailings, dumps or other fragmented metal-value containing bodies unless otherwise indicated.

DESCRIPTION OF THE PRIOR ART

In situ leaching has been developed over the past several decades as a method for the recovery of mineral values which could not economically be recovered by other means. Usually this involves the flooding of leaching agents into the ore body, or trickle leaching of fragmented ore-bodies or tailings.

Illustrative of the numerous patents that have been issued in the field and perhaps closest to the present invention are U.S. Pat. Nos. to Hard et al 3,708,206 and to Huff et al 3,894,770. Hard et al shows injecting a leach solution containing a pressurized oxygen-containing gas into an underground ore body. On releasing the pressure an oxygen-containing foam is created. The patentees suggest that the multitude of small bubbles penetrate further into the crevices of the ore formation. Huff et al show the removal of leaching liquor from a deep wellbore in an in-situ mining operation by a gas lift. After treatment the column of lixivant is frothed by injection of air which may contain additional oxygen and/or $SO_2$. A chemical reaction is affected simultaneously with the gas lift operation in the leachant. Neither of these patents however, are directed to contacting a broken ore body or other fragmented metal-value containing bodies with a relatively stable reagent-containing foam. The relatively large volumes of leach solution required by the prior art methods present a potential environmental hazard should the leach solution find its way into ground water or surface waterways. In addition channelization of flow of the leach solution through the ore body can be a serious problem.

It is the primary object of the present invention to provide a method for leaching a broken or fragmented ore or metal value-containing mass using a leaching reagent-containing relatively stable foam which is passed through the mass and leaches out metal values, whereby the amount of leaching solution required is significantly reduced, the danger of environmental pollution is lessened and the overall efficiency is enhanced.

It is a further object of the invention to drive the foam through the mass by gas pressure.

It is a further object of the invention to leach the mass by driving the foam in a generally upward direction and then permitting the leaching reagent to drain down.

Still another object of the invention is to leach a mass by applying the foam to the top portion of the mass and passing the foam downward by employing gases heavier than air as foaming and driving means.

Yet a further object of the invention is to backfill a mine stope with fragmented ore, mill tailings or other fragmented metal value-containing mass and then leaching with reagent-containing foam, injecting the foam at the bottom of the mass either in a periodic cycle with drain down periods, or continuously, with drain-down occurring at the periphery of the mass.

Further objects will become apparent from the rest of the specification and from the appended claims.

BRIEF DESCRIPTION OF THE INVENTION

Although in situ leach mining is applicable to the recovery of many minerals, to date it has been largely applied to the recovery of copper from underground ore bodies, or heap or dump leaching. Where copper exists in native metal form, leaching may be accomplished by use of cupric ammonium carbonate solutions containing 200 percent equivalent of ammonia. The reaction, forming the reduced compound, cuprous ammonium carbonate, takes place according to the following equation:

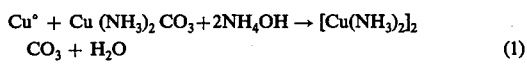

To regenerate more leaching agent the cuprous form is reoxidized by contact with air to the cupric form in the presence of ammonium carbonate (formed by reacting $CO_2$ with $NH_4OH$) and water.

The overall reaction is:

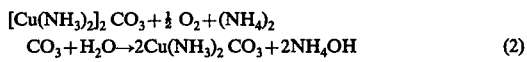

This process has been used for many decades to recover metal values from low-grade copper ore and also for reprocessing copper mill tailings.

Where copper exists in a combined form, dilute sulfuric acid solution of a pH 1-2 has been used to extract copper as copper sulfate.

Both of these methods use flood leaching or downward percolation of leachant to contact the ore in situ. A number of disadvantages are inherent in the system. Because of the large volume of leachant required, the cost of flood leaching is significant. In the event of an unexpected fissure below the ore body, a considerable loss of reagent may take place with concomittant financial loss. In addition, such loss of reagents poses a serious environmental threat to ground water systems.

In employing downward percolation of leach solutions which are applied by sprays or trickle tubes to fragmented ore heaps or to underground mineral deposits, the volume of reagents is considerably less than in flood leachings. As a result, the cost is less and the environmental impact is lessened. However, the percolation technique is limited to a downward advancement of leach solution.

In many cases contacting a fragmented ore or metal value containing body in a generally upward or horizonal advancement would be highly beneficial. However, the prior art flooding or downward percolation techniques do not readily permit this.

I have devised a method for passing reagent-carrying foam through the fragmented material employing air or other gas pressure.

A surface active agent or surfactant is incorporated in the leaching solution. Surfactants usually lower surface tension of water or other liquids by 50 to 70 pct with as low a concentration as 0.1 pct. Their presence in the solution also effects the temporary entrapment of air or other gas used for bubble generation. The concentration of surfactant determines the foam standup time, with higher concentration effecting easier foaming action and longer foam duration. Foam stabilizers may be added to extend standup time.

In the case of leaching native copper with cupric ammonium carbonate, the oxygen required to regenerate the leaching agent as shown in equation 2 is supplied by air or oxygen-containing gas under pressure. It serves the three-fold function of being an oxidant for the reaction, a foam producer and as the driving means to propel the foam through the mass.

In other leaching systems, such as acid leaching of sulfide types of copper ores, air or oxygen is not required for the leaching reaction and serves only as the foam carrier and driving medium. However, other gases may be substituted for air with advantages where it is desired to move the foam in directions other than the vertical (such as laterally) or with greater speed.

Gases lighter than air, such as helium or helium/air mixtures as foam carriers increases the traverse speed upward through a fractured or rubbled ore body. Carbon dioxide, or vapors of halogenated hydrocarbons, either in pure form or as mixtures with air, will effect a more rapid downward migration of foam through the fractured ore since they are heavier than air. Sloping veins of fragmented ore deposits are particularly amenable to treatment according to this modification.

Use of this foaming technique serves to reduce channelization of reagent flow patterns within a fragmented ore body. This results from the lower density of the foamed reagent (as compared with reagent liquid) flowing through the interstitial spaces of the rubbled ore. The foam can be injected in cycles, allowing drain down, or continuously.

EXAMPLE I

The following example illustrates the process. To simulate a sloping, fragmented ore vein, a plastic tube (6 in. diam. × 6 ft length), was closed at the bottom end and was supported in a stand at an angle of 30° from the horizontal. It was three quarters filled with native copper ore fragments (ranging in mesh size of minus 2 in, plus 1 in). The volume of voids within the ore fragments was determined to be about 10 liters.

An ammoniacal ammonium carbonate 0.2 molar leachant solution was mixed with 1 percent by weight of a foaming-type surfactant, Tergitol NPX[(1)]

[(1)] A nonyl-phenol-polyethyleneoxide surfactant containing an average of 10 1/2 $C_2H_4O$ units per molecules and distributed by Union Carbide Corporation A measured quantity of the leachant was added to the tube and allowed to flow down to the bottom. Air was admitted into the bottom end of the tube via a ¼ inch fitting and bubbled through the solution to cause foaming. The minimum amount of leachant solution which produced a foam which emerged at the top of the ore mass was about 200 ml, with a preferred volume found to be about 400 ml. Thus, the volume of leaching solution required with the foaming technique of this invention is only about 2 to 4 percent of that required in full-flooding leaching.

The diffusion of leachant into the pore spaces or cracks of each ore fragment is generally considered to be the limiting factor in the total leaching process. Superficial contact of the leaching solution and the ore, therefore, need only be intermittent, as in trickle leaching, as in the process of this invention in which foam carries the leaching agents.

The foaming agent or surfactant employed was a nonionic material. However, almost any surfactant type can be used, care only being needed where possible incompatability might be encountered, as with strong acids or basic type leaching agents which could decompose the surfactant.

EXAMPLE II

The effect of concentration of foaming agent on the stability of the foam is shown in the following example.

A plastic tube, 6 inches in diameter and 77 inches long, inclined 55% from the vertical, was filled with broken copper ore having a mesh size of minus two inches, plus one inch. About 400 ml of a 0.2 normal ammonium carbonate leach solution to which Tergitol NPX was added was employed as the leaching solution. The solution was poured into the tube and collected at the bottom. It was then aerated with a flow of air adjusted to produce foaming and the resulting foam ascended in the tube. So long as the air flow was sufficient to produce foaming, the rate of air flow appeared to have only a slight effect on foam height.

The following table gives the height of the foam in the tube and the foam stability and shows the stability of the foam to be a function of the concentration level.

TABLE 1

Foam stability and rise height as a function of surfactant concentration in a 0.2 normal ammonium carbonate solution

| Surfactant, pct | Foam height, inches | Maximum foam stability, minutes |
| --- | --- | --- |
| 0.05 | 17 | 12 |
| 0.10 | 32 | 35 |
| 0.20 | 45 | 40 |
| 0.40 | 60 | 50 |
| 0.80 | 75 | 70 |
| 1.60 | 77 | 75 |
| 3.20 | 77 | 85 |

EXAMPLE III

The experiment of Example 2 was repeated using a 0.2 normal sulfuric acid solution. Table 2 sets forth the results obtained.

TABLE 2

Foam stability as a function of surfactant concentration in a 0.2 normal sulfuric acid solution

| Surfactant, pct | Foam height, inches | Maximum foam stability, minutes |
| --- | --- | --- |
| 0.05 | 19 | 23 |
| 0.10 | 30 | 50 |
| 0.20 | 41 | 55 |
| 0.40 | 48 | 60 |
| 0.80 | 70 | 70 |
| 1.60 | 77 | 75 |
| 3.20 | 77 | 90 |

As shown in Tables 1 and 2 nonionic surfactants function well in either acid or basic solutions. The foam stability times were adequate with Tergitol NPX, slightly greater time periods being observed in the acidic leaching medium.

Under comparable experimental conditions, the 0.2 N ammonium carbonate solution yielded 1,080 parts per million (ppm) copper after seven successive foam injection-foam drain down cycles. The 0.2 N sulfuric acid solution yielded 150 ppm after seven foaming cycles. The test ore was a native copper ore.

These tests simulated a fragmented ore body with no fracture or fissure to allow leaks. With this closed system, recoveries of drained-down foam approximated 90 to 95 pct. Most losses or retention of foam or fluid occur within capillary-sized pore spaces and hairline fissures. In a futher typical experiment, surfactant solutions were aerated to convert about 150 ml to foam, to fill a void volume of about 10 liters. After the foam collapsed, the liquid recovered from the foam fraction was about 135 to 143 ml (90 to 95 pct recovery).

Examples 1-3 relate to leaching fragmented sloping ore bodies. The process may be employed to leach mine stopes, backfilled with low-grade ore or mill tailing. The surfactant-containing leachant can be introduced at the bottom of the ore mass and caused to foam-up and rise through the mass using air or lighter than air gas mixture, such as a helium-air mixture. The leaching process can be carried out cyclically, with foam-up and drain-down cycles or continuously, with the drain-down occurring at the periphery of the mass.

Another modification of the process is to foam the leachant with a heavy gas, such as $CO_2$ or vapors of halogenated hydrocarbons to produce a foam with a relatively high density. Said foam is then applied to the top surface of mill tailings, piles or dumps where because of the greater density more rapid downward movement of the foam is achieved.

What is claimed is:

1. A process for the recovery of copper values from fragmented copper-containing bodies which comprises:
    a. introducing a leaching solution comprising a leaching agent consisting of ammonium carbonate or sulfuric acid and a surfactant into a mass of said fragmented bodies,
    b. foaming said solution by introducing a gas therein,
    c. passing the foamed leaching solution through the said mass whereby said foamed leaching solution forms pregnant leachant containing copper values, and
    d. recovering the pregnant leachant.

2. The method of claim 1 wherein the fragmented body is a sloping ore body, the surfactant is non-ionic and the foam is passed generally in an upward direction through said body.

3. The method of claim 2 wherein the ore body comprises a sulfide type copper ore, and the leaching agent comprises dilute sulfuric acid.

4. The method of claim 3 wherein the gas introduced to foam the leaching solution is lighter than air.

5. The method of claim 1 wherein the fragmented body comprises mill tailings, dumps or heaps and the foamed leaching solution is applied at the top of said fragmented body.

6. The method of claim 5 wherein the gas introduced to foam the leaching agent is heavier than air.

7. The method of claim 1 wherein the foamed solution is passed upwardly through the mass, periodically alternating with drain down cycles.

* * * * *